United States Patent
Zhang et al.

(10) Patent No.: US 11,770,727 B2
(45) Date of Patent: Sep. 26, 2023

(54) METHOD AND APPARATUS FOR CHANNEL STATE INFORMATION REPORTING

(71) Applicant: Telefonaktiebolaget LM Ericsson (publ), Stockholm (SE)

(72) Inventors: Zhan Zhang, Beijing (CN); Gen Li, Beijing (CN); Jinhua Liu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 264 days.

(21) Appl. No.: 17/265,745

(22) PCT Filed: Jul. 26, 2019

(86) PCT No.: PCT/CN2019/097983
§ 371 (c)(1),
(2) Date: Feb. 3, 2021

(87) PCT Pub. No.: WO2020/029816
PCT Pub. Date: Feb. 13, 2020

(65) Prior Publication Data
US 2021/0235308 A1    Jul. 29, 2021

(51) Int. Cl.
*H04W 24/10* (2009.01)
*H04L 5/00* (2006.01)
*H04W 72/23* (2023.01)

(52) U.S. Cl.
CPC ........... *H04W 24/10* (2013.01); *H04L 5/0057* (2013.01); *H04W 72/23* (2023.01)

(58) Field of Classification Search
CPC .... H04W 24/10; H04W 72/042; H04L 5/0057
USPC .......................................................... 370/329
See application file for complete search history.

(56) References Cited

U.S. PATENT DOCUMENTS

| 2015/0029971 A1 | 1/2015 | Nishio et al. |
| 2015/0063177 A1* | 3/2015 | Kim ................. H04L 5/0048 370/280 |
| 2015/0103774 A1 | 4/2015 | Nagata et al. |
| 2015/0245345 A1 | 8/2015 | Gao et al. |
| 2015/0312920 A1* | 10/2015 | Hu .................. H04L 5/0053 370/329 |

(Continued)

FOREIGN PATENT DOCUMENTS

| CN | 103580797 A | 2/2014 |
| CN | 104380641 A | 2/2015 |

(Continued)

OTHER PUBLICATIONS

International Search Report and Written Opinion of the International Searching Authority for PCT International Application No. PCT/CN2019/097983 dated Oct. 12, 2019.

(Continued)

*Primary Examiner* — Christopher R Crompton
(74) *Attorney, Agent, or Firm* — Sage Patent Group

(57) ABSTRACT

Various embodiments of the present disclosure provide a method for CSI reporting. The method comprises detecting a downlink transmission, and transmitting, in response to the detection of the downlink transmission, a channel state information (CSI) report in an uplink control resource configured for CSI reporting. According to the embodiments of the present disclosure, a timely and accurate CSI reporting can be provided.

17 Claims, 11 Drawing Sheets

(56) References Cited

U.S. PATENT DOCUMENTS

2017/0149525 A1    5/2017  Guan
2019/0123881 A1    4/2019  Lee et al.
2019/0349973 A1*  11/2019  Yang .................. H04W 72/535
2020/0092055 A1*  3/2020  Choi ....................... H04L 5/005

FOREIGN PATENT DOCUMENTS

| CN | 105027603 A | 11/2015 |
|---|---|---|
| WO | 2016073039 A1 | 5/2016 |
| WO | 20170200307 A1 | 11/2017 |

OTHER PUBLICATIONS

Extended European Search Report for European Patent Application No. 19848127.7, dated Apr. 4, 2022, 11 pages.

\* cited by examiner

METHOD AND APPARATUS FOR CHANNEL STATE INFORMATION REPORTING

CROSS REFERENCE TO RELATED APPLICATIONS

This application is a 35 U.S.C. § 371 national stage application of PCT International Application No. PCT/CN2019/097983 filed on Jul. 26, 2019, which itself is a continuation of PCT International Application No. PCT/CN2018/099939, filed Aug. 10, 2018, the disclosures and contents of which are incorporated by reference herein in their entireties.

FIELD OF THE INVENTION

The present disclosure generally relates to communication networks, and more specifically, to channel state information (CSI) reporting in a communication network.

BACKGROUND

This section introduces aspects that may facilitate a better understanding of the disclosure. Accordingly, the statements of this section are to be read in this light and are not to be understood as admissions about what is in the prior art or what is not in the prior art.

It is being discussed in 3GPP on how to enhance current mobile communication networks to provide a new generation of communications between a wide range of machines, which is also referred to as machine-type communication (MTC). One type of MTC is critical machine-type communication (CMTC). CMTC requires very low latency, very high reliability and very high availability in communication.

Generally, CMTC can be applicable in the following cases, for example:
- Factory automation, where actuators, sensors and control systems communicate with each other. In this case, typical latency time is around 1 ms.
- Motion control within construction robots, which requires 1 ms latency.
- Remote control of machines, which requires 5-100 ms latency,
- Smart energy grids, which require 3-5 ms.
- Performance enhancement regarding TCP/IP Slow-start issue.

With the rapid development of networking and communication technologies, a wireless communication network, such as a long term evolution (LTE)/fourth generation (4G) network or a new radio (NR)/fifth generation (5G) network, may provide a latency and reliability critical communications such as CMTC.

In the LTE network, a short time transmission interval (sTTI) concept is introduced. A scheduling unit can be defined as either a regular TTI (1 ms) or a sTTI (<1 ms). The regular TTI contains fourteen orthogonal frequency division multiplex (OFDM) symbols, and the sTTI slot can consist of one or several consecutive OFDM symbols. One possible configuration is that the sTTI slot consists of 2 or 7 OFDM symbols, but other structures, e.g., less than 14 OFDM symbols, can be envisioned as well. Furthermore, an sTTI-enabled user equipment (UE) may support different types of traffic depending on an application requirement.

In the NR network, an ultra-reliable low latency communication (URLLC) can be provided, which provides short latency and ultra-high reliability for certain kinds of MTC services, e.g. CMTC.

To meet simultaneous requirements on critical latency and high reliability demanded by CMTC, a straight-forward solution is that an eNB or gNB allocates a large radio resource to transmit a data packet in a downlink, so that a much low modulation and coding scheme (MCS) can be used with a conservative link adaptation. However, this solution would directly cause very low system efficiency (e.g. spectrum efficiency) in general.

Hence, normally a swift and accurate link adaptation is a key factor. It has fewer retransmissions and interactions between eNB/gNB and UEs for a process of link adaptation, and thus the system efficiency can be improved. Moreover, each data packet can be reliably transmitted within a shorter period of time without sacrificing much spectrum efficiency.

In order to achieve such swift and accurate link adaptation, a timely CSI updating at the eNB/gNB by UE reporting CSI is critical. In general, a rich, timely and accurate CSI is necessary for the eNB/gNB to decide on MCS adjustment at each retransmission. This could help a lot to make the link adaptation more effective and precise. Ultimately, this could make it possible to fulfill the challenging CMTC or URLLC requirements.

Thus, it is desirable to improve CSI reporting in a communication network.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

In a wireless communication network such as NR or LTE network, a UE may receive a data packet from an eNB/gNB. Then the UE may send an ACK/NACK feedback to the eNB/gNB. When the eNB/gNB receives the NACK feedback, it will perform a link adaptation procedure to adjust transmission parameters for subsequent data packet. The link adaptation is usually based on the CSI reported by the UE. Therefore, there may be a need to provide a timely and accurate CSI reporting.

Embodiments of the present disclosure propose solutions of CSI reporting in a communication network, so as to provide a timely and accurate CSI reporting and achieve a low latency and high reliability communication.

According to a first aspect of the present disclosure, there is provided a method performed by a terminal device. The method comprises detecting a downlink transmission, and transmitting, in response to the detection of the downlink transmission, a CSI report in an uplink control resource configured for CSI reporting. In particular, the uplink control resource may comprise Physical Uplink Control Channel (PUCCH) resource.

In accordance with an exemplary embodiment, detecting the downlink transmission may comprise detecting a failure of a downlink data transmission. In an exemplary embodiment, the CSI report may be transmitted in response to the detection of the failure.

In accordance with an exemplary embodiment, detecting the downlink transmission may comprise detecting a Physical Downlink Control Channel (PDCCH) transmission to trigger CSI reporting.

In accordance with an exemplary embodiment, the PDCCH transmission may be addressed to a CSI-radio network temporary identifier (CSI-RNTI).

In accordance with an exemplary embodiment, the PDCCH transmission may be common to a plurality of terminal devices.

In accordance with an exemplary embodiment, the PDCCH transmission may carry a downlink assignment and an indicator indicating the triggering of the CSI reporting.

In accordance with an exemplary embodiment, the PDCCH transmission may indicate the uplink control resource configured for CSI reporting.

In accordance with an exemplary embodiment, the uplink control resource may be indicated by a control channel element (CCE) index for the PDCCH transmission.

In accordance with an exemplary embodiment, the uplink control resource may be indicated by a specific indicator carried by the PDCCH transmission.

In accordance with an exemplary embodiment, detecting the downlink transmission may comprise detecting a downlink data transmission, wherein the downlink data transmission carries a medium access control (MAC) control element (CE) for triggering CSI reporting.

In accordance with an exemplary embodiment, detecting the downlink transmission may comprise detecting a downlink data transmission which uses a preconfigured downlink assignment.

In accordance with an exemplary embodiment, the downlink data transmission may indicate the uplink control resource configured for CSI reporting with a physical resource block (PRB) index for the downlink data transmission.

In accordance with an exemplary embodiment, the method according to the first aspect of the present disclosure may further comprise receiving a configuration message from a network node, wherein the configuration message indicates at least one uplink control resource configured for CSI reporting. In an exemplary embodiment, the CSI report may be transmitted in a selected uplink control resource from the at least one PUCCH resource by the terminal device.

In accordance with an exemplary embodiment, the configuration message may further indicate a content of the CSI report and an object of CSI measurement.

In accordance with an exemplary embodiment, the content of the CSI report may comprise at least one of: channel quality indicator (CQI), delta-CQI, rank indication (RI), precoding matrix indicator (PMI), radio frequency transmission point selection, an index of a preferable component carrier, interference measurement, and transmission time interval (TTI) bundling repetition number recommend by the terminal device.

In accordance with an exemplary embodiment, the object of CSI measurement may comprise at least one of: CSI reference signal (CSI-RS), demodulation reference signal (DMRS), and received downlink data.

In accordance with an exemplary embodiment, the configuration message may further indicate a transmission control priority for the uplink control resource.

In accordance with an exemplary embodiment, the configuration message may be a radio resource control message or a downlink control message.

In accordance with an exemplary embodiment, the uplink control resource may be shared by a group of terminal devices including the terminal device.

In accordance with an exemplary embodiment, the shared uplink control resource may be orthogonal to uplink control resources dedicated to the respective one of the group of terminal devices.

In accordance with an exemplary embodiment, the uplink control resource may be dedicated to the terminal device.

In accordance with an exemplary embodiment, the method according to the first aspect of the present disclosure may further comprise receiving a control message to activate or deactivate the transmission of the CSI report caused by the detection of failure, and activating or deactivating the transmission of the CSI report caused by the detection of failure.

In accordance with an exemplary embodiment, the CSI report and a NACK message may be transmitted in the same dedicated uplink control resource to the terminal device in response to the detection of the failure.

According to a second aspect of the present disclosure, there is provided a terminal device. The terminal device comprises one or more processors and one or more memories comprising computer program codes. The one or more memories and the computer program codes may be configured to, with the one or more processors, cause the terminal device at least to perform any step of the method according to the first aspect of the present disclosure.

According to a third aspect of the present disclosure, there is provided a computer-readable medium having computer program codes embodied thereon which, when executed on a computer, cause the computer to perform any step of the method according to the first aspect of the present disclosure.

According to a fourth aspect of the present disclosure, there is provided a method performed by a network node. The method may comprise performing a downlink transmission to a terminal device, and receiving a CSI report in an uplink control resource configured for CSI reporting from the terminal device, in response to the downlink transmission. In particular, the uplink control resource may comprise Physical Uplink Control Channel (PUCCH) resource.

In accordance with an exemplary embodiment, performing the downlink transmission to the terminal device may comprise performing a downlink data transmission to the terminal device. In an exemplary embodiment, the CSI report may be received in response to receiving a NACK message which indicates a failure of the downlink data transmission from the terminal device.

In accordance with an exemplary embodiment, performing the downlink transmission to the terminal device may comprise performing a PDCCH transmission to trigger CSI reporting.

In accordance with an exemplary embodiment, performing the downlink transmission to the terminal device may comprise performing a downlink data transmission, wherein the downlink data transmission carries a MAC control element for triggering CSI reporting.

In accordance with an exemplary embodiment, performing the downlink transmission to the terminal device may comprise performing a downlink data transmission using a preconfigured downlink assignment.

In accordance with an exemplary embodiment, the method according to the fourth aspect of the present disclosure may further comprise transmitting a configuration message, wherein the configuration message indicates at least one uplink control resource configured for CSI reporting.

In accordance with an exemplary embodiment, the uplink control resource may be shared by a group of terminal devices served by the network node.

In accordance with an exemplary embodiment, the method according to the fourth aspect of the present disclosure may further comprise transmitting a control message to activate or deactivate transmission of the CSI report caused by the detection of failure.

In accordance with an exemplary embodiment, the CSI report and the NACK message may be received in the same dedicated uplink control resource to the terminal device.

According to a fifth aspect of the present disclosure, there is provided a base station. The base station comprises one or more processors and one or more memories comprising computer program codes. The one or more memories and the computer program codes may be configured to, with the one or more processors, cause the base station at least to perform any step of the method according to the fourth aspect of the present disclosure.

According to a sixth aspect of the present disclosure, there is provided a computer-readable medium having computer program codes embodied thereon which, when executed on a computer, cause the computer to perform any step of the method according to the fourth aspect of the present disclosure.

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION

Figure 1:
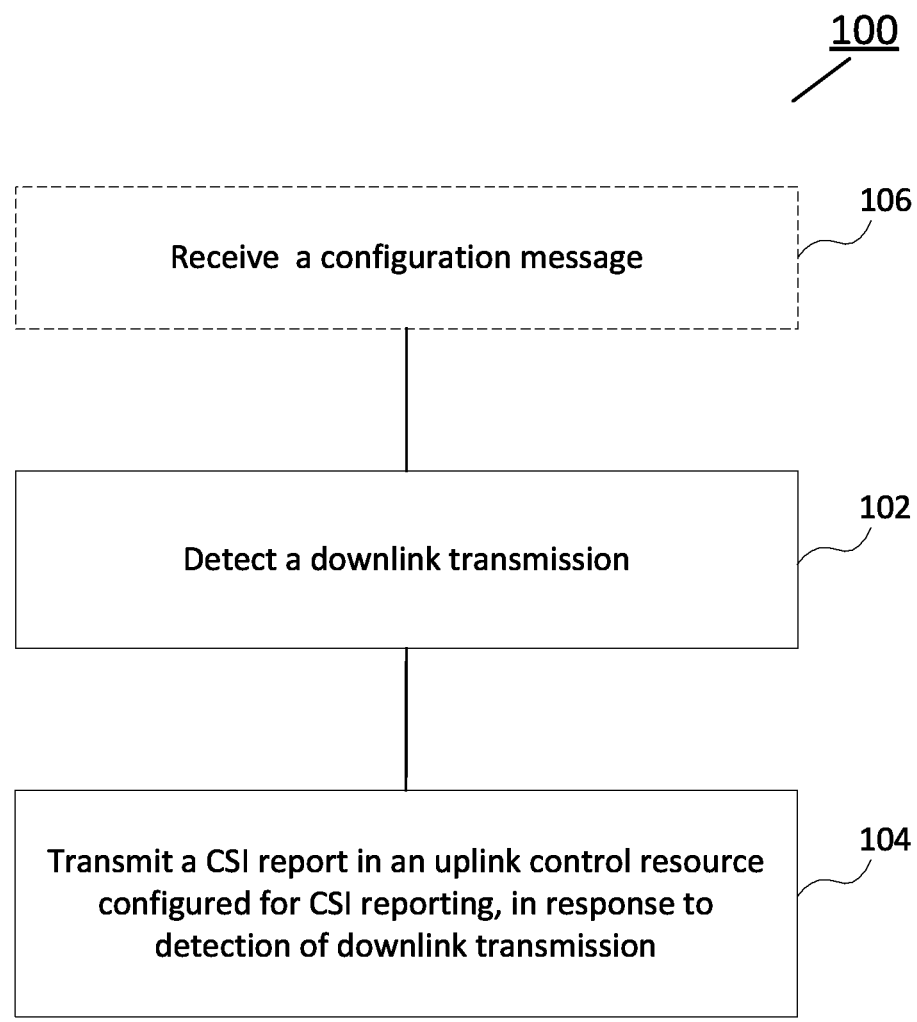
FIG. 1 is a flowchart illustrating a method performed by a terminal device according to some embodiments of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "network node" refers to a network device in a communication network via which a terminal device accesses to the network and receives services therefrom. The network node may refer to a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device may refer to a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

As one particular example, the terminal device may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As described above, in a wireless communication network such as LTE or NR network, the eNB/gNB may perform the link adaptation based on the CSI reported by the UE. In order to meet the low latency and high reliability requirement, the timely and accurate CSI reporting mechanism is desirable. But the current method for the CSI reporting is not sufficiently capable in this regard.

In the communication network, to adapt to time-varying radio environments (e.g. fading and interference changes over time) and UE mobility, a timely and accurate CSI is necessary for the eNB to make precise transmission parameter adjustments for a retransmission, such as time-frequency resource allocation, beamforming adjustment, or MCS adjustment. The current link adaptation mainly based on an ACK/NACK feedback and the CSI reporting mechanism is independent of transmission status.

For example, the current CSI reporting may be performed periodically. The UE would transmit a CSI report periodically. Thus, when the eNB/gNB receives NACK feedback from the UE and needs to perform the link adaption, it may happen that the CSI is not the most recent. The eNB/gNB cannot adjust the transmission parameters precisely, which may lead to high latency and low spectrum efficiency. In addition, the current CSI reporting may be performed aperiodically. In this case, the eNB/gNB may instruct the CSI reporting for each downlink transmission to the UE. The UE will transmit the CSI report according to the instruction. But these two CSI reporting ways usually incur a huge cost in radio resource. Such CSI reporting is undesirable as it offsets the spectrum efficiency too much. In short, so far, there is no straightforward way to provide efficient CSI reporting without severely sacrificing spectrum efficiency.

In accordance with some exemplary embodiments, the present disclosure provides solutions to enable a terminal device (such as a UE) to perform the CSI reporting timely and accurately. According to the proposed solutions, the terminal device may transmit a CSI report to a network node (such as a serving gNB/eNB of the UE) in an uplink control resource (e.g. PUCCH resource) configured for CSI reporting, in response to detecting a downlink transmission. Correspondingly, the network node may allocate at least one uplink control resource configured for CSI reporting. Further, the network node may provide the allocated at least one uplink control resource to the terminal device via a special configuration message such as a PDCCH order, or a radio resource control (RRC) signaling message.

Many advantages can be achieved by applying the proposed solutions according to various embodiments of the present disclosure. For example, the UE can provide the timely and accurate CSI information to the serving eNB/gNB. The serving eNB/gNB can accurately capture a channel state change, and perform an accurate transmission parameter adjustment within almost one link-adaption interaction between eNB/gNB and the UE, instead of many step-by-step adjustment based on receiving a sequence of ACK/NACK feedbacks. The CSI reporting according to the proposed solution can render a faster and more precise transmission parameter adjustment, thereby meeting the simultaneous requirements on low latency and high reliability. The above benefits could be extremely meaningful for latency and reliability critical communications such as CMTC or URLLC traffics.

It is noted that some embodiments of the present disclosure are mainly described in relation to LTE or NR specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does not limit the present disclosure naturally in any way. Rather, any other system configuration or radio technologies may equally be utilized as long as exemplary embodiments described herein are applicable.

FIG. 1 is a flowchart illustrating a method 100 according to some embodiments of the present disclosure. The method 100 illustrated in FIG. 1 may be performed by an apparatus implemented in a terminal device or communicatively coupled to a terminal device. In accordance with an exemplary embodiment, the terminal device may be, for example, a UE. Further the terminal device may be the UE supporting the low latency and high reliability communication, e.g. CMTC or URLLC service.

According to the exemplary method 100 illustrated in FIG. 1, the terminal device may detect a downlink transmission, as shown in block 102. For example, the terminal device may detect a downlink data transmission, such as Physical Downlink Shared Channel (PDSCH) transmission.

Alternatively, the terminal device may detect a downlink control information transmission, such as PDCCH transmission.

In response to the detection of the downlink transmission, the terminal device may transmit a CSI report in a PUCCH resource configured for CSI reporting to a network node such as a serving eNB/gNB of the terminal device, as shown in block 104. A person skilled in the art will appreciate that the PUCCH resource can be represented by a PUCCH resource block.

In accordance with an exemplary embodiment, the terminal device may detect a failure of the downlink data transmission. Usually during the downlink data transmission, the terminal device will detect whether a data packet is successfully received. If the terminal device does not receive the data packet successfully, it is detected that there is a failure in the downlink data transmission. In response to the detection of the failure, the terminal device may transmit the CSI report to the network node. In this way, the CSI information reflecting the current channel state can be timely provided to the network node, and thus a success probability at each of first retransmissions or each of first a few of retransmissions can be maximized.

Alternatively, in an exemplary embodiment, the terminal device may detect a downlink data transmission which carries a medium access control (MAC) control element (CE) for triggering CSI reporting. Then the terminal device may transmit the CSI report according to the MAC CE.

Alternatively, in an exemplary embodiment, the terminal device may detect a downlink data transmission which uses a preconfigured semi-static downlink assignment. In this case, the terminal device may automatically transmit the CSI report.

Additionally, the downlink data transmission may also indicate the PUCCH resource configured for CSI reporting with a physical resource block (PRB) index for the downlink data transmission. Thus the terminal device can use the PUCCH resource indicated by the PRB index to transmit the CSI report.

In accordance with an exemplary embodiment, the terminal device may detect a PDCCH transmission to trigger CSI reporting. Then the terminal device may transmit the CSI report in response to this PDCCH transmission. Generally, the PDCCH transmission may be represented as a PDCCH message. In an exemplary embodiment, the PDCCH transmission to trigger CSI reporting may be addressed to a CSI-radio network temporary identifier (CSI-RNTI). The CSI-RNTI may be associated with one or more terminal devices. Alternatively, the PDCCH transmission to trigger CSI reporting may be common to a plurality of terminal devices, which can save the radio resource. Alternatively, the PDCCH transmission to trigger CSI reporting may carry a downlink assignment and an indicator indicating the triggering of the CSI reporting.

Additionally, the PDCCH transmission may also indicate the PUCCH resource configured for CSI reporting. In an exemplary embodiment, the PUCCH resource may be indicated by a control channel element (CCE) index for the PDCCH transmission. Alternatively, the PUCCH resource may be indicated by a specific indicator carried by the PDCCH transmission. Thus the terminal device can use the PUCCH resource indicated by the CCE index and the specific indicator to transmit the CSI report.

Additionally, according to the exemplary method 100 illustrated in FIG. 1, the terminal device may receive a configuration message from the network node, wherein the configuration message indicates at least one PUCCH resource configured for CSI reporting, as shown in block 106. In an exemplary embodiment, the terminal device may randomly select one of the at least one PUCCH resource to transmit the CSI report.

Usually in the LTE or NR network, multiplexing of PUCCH resources may be made in two manners. One is to use the same time-frequency resource block but with different orthogonal codes for different UEs. The second manner is to use different time-frequency resource blocks for different UEs. Therefore, the PUCCH resources for different UEs are orthogonal to each other. In addition, the network node may allocate a dedicated PUCCH resource to a terminal device for ACK/NACK transmission.

In some exemplary embodiments, the at least one PUCCH resource configured for CSI reporting may be shared by a group of terminal devices served by the network node. Thus the shared PUCCH resource is orthogonal to the PUCCH resources dedicated to the respective one of the group of terminal devices. In an exemplary embodiment, the group can consist of a plurality of terminal devices supporting a low latency and high reliability communication service, such as URLLC service. The size of the group can be managed by the network node. In addition, multiple groups of terminal devices may be also envisioned. In this case, for different groups of terminals, the shared PUCCH resources for CSI reporting will differ from each other.

Alternatively in some exemplary embodiments, the at least one PUCCH resource configured for CSI reporting may be dedicated to the individual terminal device. In this case, the PUCCH resource configured for CSI reporting may be orthogonal to the PUCCH resource for ACK/NACK transmission, in an exemplary embodiment.

Alternatively, the CSI report and the ACK/NACK transmission may be transmitted in the same dedicated PUCCH resource.

Alternatively or additionally, the configuration message may further indicate a content of the CSI report and an object of CSI measurement. For example, the content of the CSI report may comprise at least one of channel quality indicator (CQI), delta-CQI, rank indication (RI), precoding matrix indicator (PMI), radio frequency transmission point selection, an index of a preferable component carrier, interference measurement, and transmission time interval (TTI) bundling repetition number recommend by the terminal device. The TTI bundling repetition number may be, for example, transmission repetition number over frequency or a certain concurrent diversity order. Moreover the object of CSI measurement may comprise CSI reference signal (CSI-RS), demodulation reference signal (DMRS), received downlink data (before or after decoding), or any combination thereof.

Alternatively or additionally, the configuration message may further indicate a transmission control priority for the PUCCH resource configured for CSI reporting. In most of cases, the transmissions of the dedicated PUCCH resource for ACK/NACK transmission and the shared PUCCH resource are subjected to different transmission control priority in terms of power or coding scheme, for example. Usually the ACK/NACK transmission should be much higher reliable than the CSI reporting. Therefore, the network node may indicate this to the terminal device via a RRC signaling message. The terminal device may scale up the power to prioritize the dedicated PUCCH resource for ACK/NACK transmission.

In accordance with an exemplary embodiment, the configuration message may be a RRC message during a connection setup procedure or a downlink control message. For example, the downlink control message may be a PDCCH message during the downlink transmission.

Additionally, in some exemplary embodiments, the terminal device may receive a control message to activate or deactivate the transmission of the CSI report caused by the detection of the downlink transmission as described previously. Then the terminal device may activate or deactivate the transmission of the CSI report. In the case that the transmission of the CSI report caused by the detection of the downlink transmission is deactivated, the terminal device may fall back to the conventional CSI reporting, e.g. periodic CSI reporting or aperiodic CSI reporting.

Figure 2:
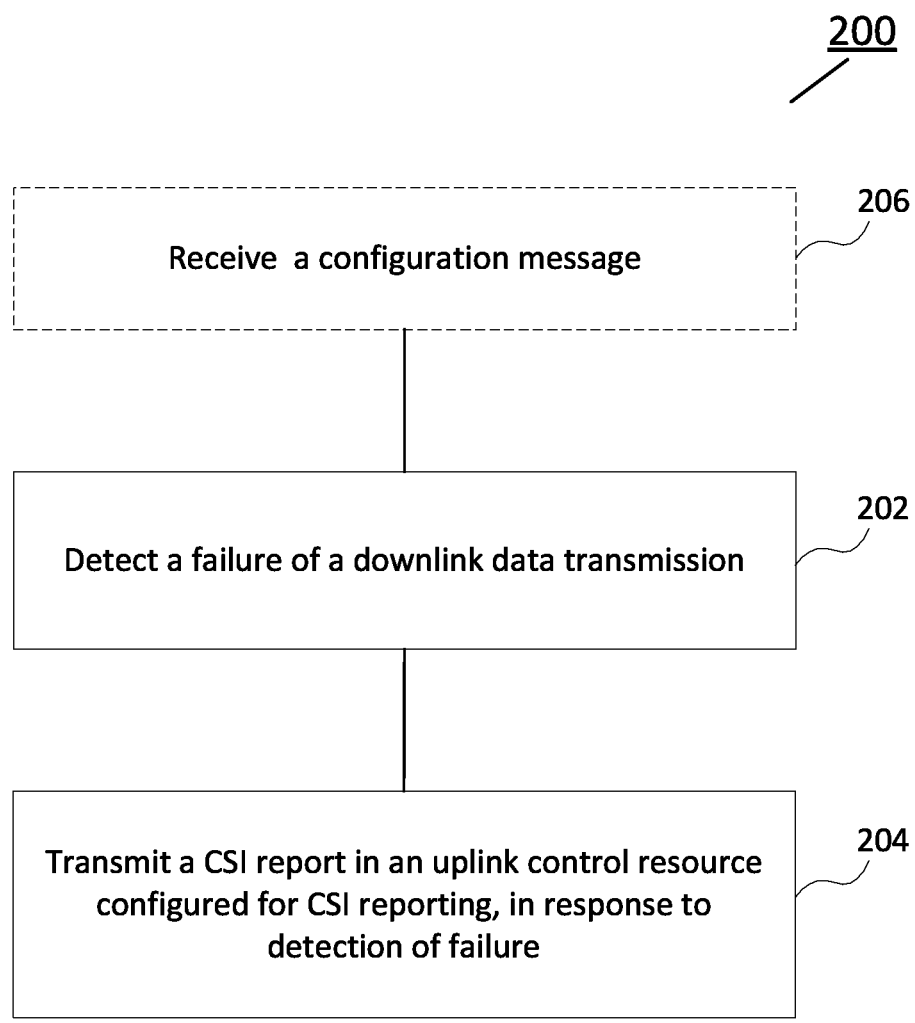
FIG. 2 is a flowchart illustrating another method performed by a terminal device according to some embodiments of the present disclosure.

FIG. 2 is a flowchart illustrating another method 200 according to some embodiments of the present disclosure. The method 200 illustrated in FIG. 2 may be performed by an apparatus implemented in a terminal device or communicatively coupled to a terminal device. In accordance with an exemplary embodiment, the terminal device may be, for example, a UE. Further the terminal device may be the UE supporting the low latency and high reliability communication, e.g. CMTC or URLLC service. In the following description with respect to FIG. 2, for the same or similar parts as those in the previous exemplary embodiments, the detailed description will be properly omitted.

Referring to FIG. 2, the terminal device may detect a failure of a downlink data transmission, as shown in block 202. In an exemplary embodiment, the downlink data transmission may be, for example, a PDSCH transmission. As described previously, the terminal device will detect whether a data packet is successfully received during the downlink data transmission. If the terminal device does not receive the data packet successfully, it is detected that there is a failure in the downlink data transmission.

In response to the detection of the failure, the terminal device may transmit a CSI report in an uplink control resource configured for CSI reporting, as shown in block 204.

Additionally, according to the exemplary method 200 illustrated in FIG. 2, the terminal device may receive a configuration message from the network node, wherein the configuration message indicates at least one uplink control resource configured for CSI reporting, as shown in block 206. In an exemplary embodiment, the terminal device may randomly select one of the at least one uplink control resource to transmit the CSI report. In an exemplary embodiment, the uplink control resource may be a PUCCH resource.

In some exemplary embodiments, the uplink control resource configured for CSI reporting may be shared by a group of terminal devices served by the network node. For example, the group may consist of a number of terminal devices supporting URLLC service. In this case, any terminal device from the group of terminal devices can use the shared uplink control resource to transmit the CSI reporting as soon as it detects the failure of the downlink data transmission.

For the CMTC or URLLC service with a lower block error rate (BLER), a probability of collision of CSI reporting using the shared uplink control resource is very low. It may be acceptable even when the collision of CSI reporting happens. The reason is that a serving network node is able to identify the collision case when observing that more than one NACK messages are received from different terminals who are supposed to send their CSI reports in the shared uplink control resource. Once the collision is identified by the network node, the network node could discard all the reports. This will not harm to the link adaption. Additionally, such collision has very low probability to happen owing to the almost independency of downlink qualities and their variations for different terminal devices from time to time. This renders the detections of the failure by different terminal devices happen at independent and different timings. Therefore, the network node almost always can receive a CSI report as soon as receiving a NACK message whenever the terminal device detects the failure of the downlink data transmission.

Alternatively in some exemplary embodiments, the uplink control resource configured for CSI reporting may be dedicated to the terminal device. In this case, the dedicated uplink control resource configured for CSI reporting may be same as or different from the uplink control resource dedicated to the terminal device for the ACK/NACK transmission. In an exemplary embodiment, the terminal device may transmit the CSI report and the ACK/NACK transmission in the same dedicated uplink control resource.

Alternatively or additionally, the configuration message may further indicate a content of the CSI report and an object of CSI measurement. For example, the content of the CSI report may comprise at least one of channel quality indicator (CQI), delta-CQI, rank indication (RI), precoding matrix indicator (PMI), radio frequency transmission point selection, an index of a preferable component carrier, interference measurement, and transmission time interval (TTI) bundling repetition number recommend by the terminal device. Moreover the object of CSI measurement may comprise CSI reference signal (CSI-RS), demodulation reference signal (DMRS), received downlink data, or any combination thereof.

Alternatively or additionally, the configuration message may further indicate a transmission control priority for the PUCCH resource configured for CSI reporting. In most of cases, the transmission of the dedicated PUCCH resource for ACK/NACK transmission and the shared PUCCH resource are subjected to different transmission control priority in terms of power or coding scheme, for example. Usually the ACK/NACK transmission should be much higher reliable than the CSI reporting. Therefore, the network node indicates this to the terminal device via a RRC signaling message. The terminal device may scale up the power to prioritize the dedicated PUCCH resource for ACK/NACK transmission.

In accordance with an exemplary embodiment, the configuration message may be an RRC message during a connection setup procedure or a downlink control message. For example, the downlink control message may be a PDCCH message during the downlink transmission.

Additionally, in some exemplary embodiments, the terminal device may receive a control message to activate or deactivate the transmission of the CSI report caused by the detection of failure, as described previously. Then the terminal device may activate or deactivate the transmission of the CSI report. In the case that the transmission of the CSI report caused by the detection of failure is deactivated, the terminal device may fall back to the conventional CSI reporting, e.g. periodic CSI reporting or aperiodic CSI reporting. In some exemplary embodiments, if a link quality becomes much higher than a preconfigured threshold or if CMTC or URLLC services/logic channels have been terminated, the network node may transmit the control message to the UE.

A person skilled in the art will appreciate that, in the above described exemplary embodiments with respect to FIG. 1 or FIG. 2, at least one Physical Uplink Shared Channel (PUSCH) resource may be allocated for CSI reporting instead of the PUCCH resource. The allocation of the PUSCH resource for CSI reporting may be provided to the terminal device in a PDCCH message.

Figure 3:
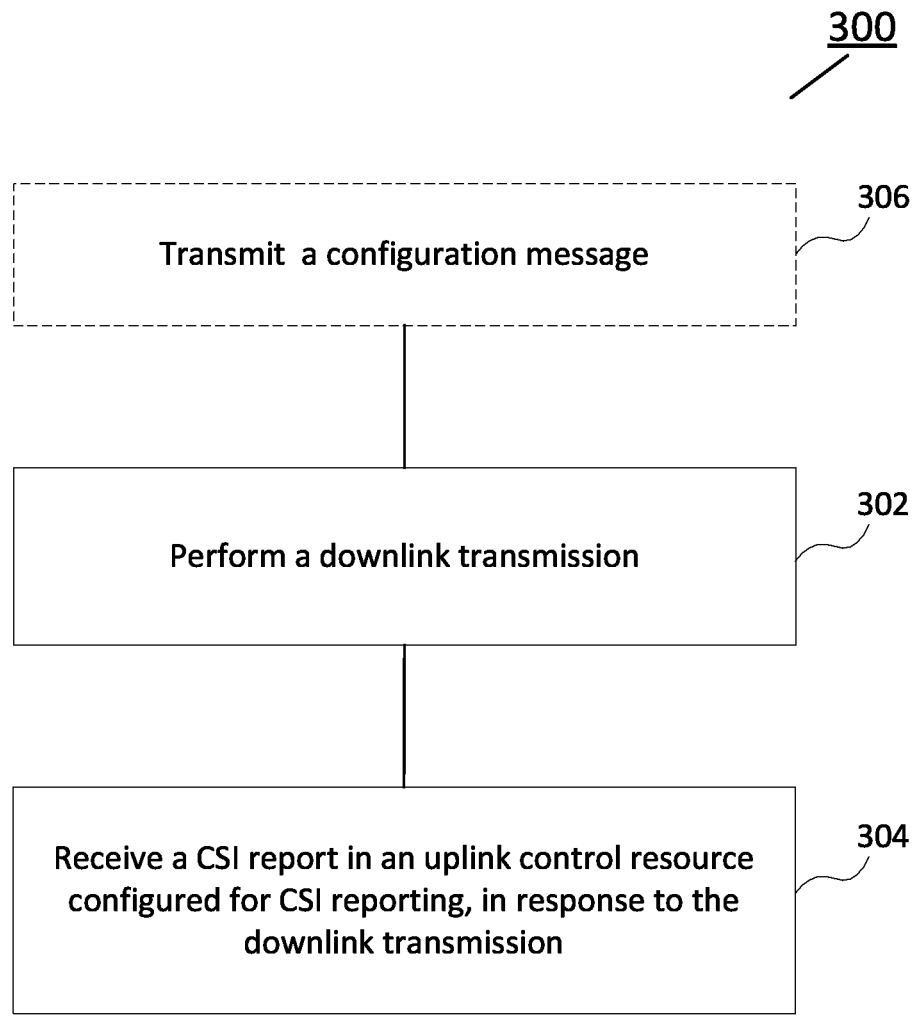
FIG. 3 is a flowchart illustrating a method performed by a network node according to some embodiment of the present disclosure.

FIG. 3 is a flowchart illustrating a method 300 according to some embodiments of the present disclosure. The method 300 illustrated in FIG. 3 may be performed by an apparatus implemented in a network node or communicatively coupled to a network node. In accordance with an exemplary embodiment, the network node such as a gNB/eNB may be configured to serve a terminal device as described with respect to FIG. 1. In the following description with respect to FIG. 3, for the same or similar parts as those in the previous exemplary embodiments, the detailed description will be properly omitted.

According to the exemplary method 300 illustrated in FIG. 3, the network node can perform a downlink transmission to a terminal device, as shown in block 302. Corresponding to operations of the exemplary method 100 as illustrated in FIG. 1, the network node in the exemplary method 300 may receive a CSI report in a PUCCH resource configured for CSI reporting from the terminal device, in response to the downlink transmission, as shown in block 304.

In accordance with an exemplary embodiment, the network node may perform a downlink data transmission such as a PDSCH transmission. Corresponding to operations of the exemplary method 100 as illustrated in FIG. 1, the network node may receive the CSI report in response to receiving a NACK message which indicates a failure of the downlink data transmission from the terminal device.

In accordance with an exemplary embodiment, the network node may perform a downlink data transmission, wherein the downlink data transmission carries a MAC control element for triggering CSI reporting. Therefore, network node may instruct the terminal device to transmit the CSI report in the downlink data transmission. In accordance with an exemplary embodiment, the network node may perform a downlink data transmission using a preconfigured semi-static downlink assignment. In this case, the network node does not need to transmit the downlink assignment for each data packet.

In accordance with an exemplary embodiment, the downlink data transmission may indicate the PUCCH resource configured for CSI reporting with a PRB index for the downlink data transmission, as described previously.

In some exemplary embodiments, the network node may perform a PDCCH transmission to trigger CSI reporting. For example, the PDCCH transmission may be addressed to a CSI-RNTI which may be associated with one or more terminal device. Alternatively, the PDCCH transmission may be common to a plurality of terminal devices. Alternatively, the PDCCH transmission may carry a downlink assignment and an indicator indicating the triggering of the CSI reporting.

Additionally, the PDCCH transmission may indicate the PUCCH resource configured for CSI reporting, as described previously.

Additionally, according to the exemplary method 300 illustrated in FIG. 3, the network node may transmit a configuration message, wherein the configuration message indicates at least one PUCCH resource configured for CSI reporting, as shown in block 306. In some exemplary embodiments, the PUCCH resource configured for CSI reporting may be shared by a group of terminal devices served by the network node. In the case where there are a number of groups of terminal devices, the network node may allocate different shared PUCCH resource for CSI reporting to the respective groups of terminal devices. In some exemplary embodiments, the PUCCH resource configured for CSI reporting may be dedicated to a terminal device. In this case, the dedicated PUCCH resource configured for CSI reporting may be same as or different from the dedicated PUCCH resource for ACK/NACK transmission. In an exemplary embodiment, the network node may receive the CSI report and ACK/NACK feedback in the same dedicated PUCCH resource.

Alternatively or additionally, the configuration message may indicate a content of the CSI report and an object of CSI measurement, as described previously. Thus the terminal device can know the object of measurement and measurement processing algorithm. Additionally, the configuration message may indicate the transmission control priority for the PUCCH resource, as described previously.

In some embodiments, the network node may additionally transmit a control message to activate or deactivate the transmission of the CSI report caused by the detection of the downlink transmission.

Figure 4:
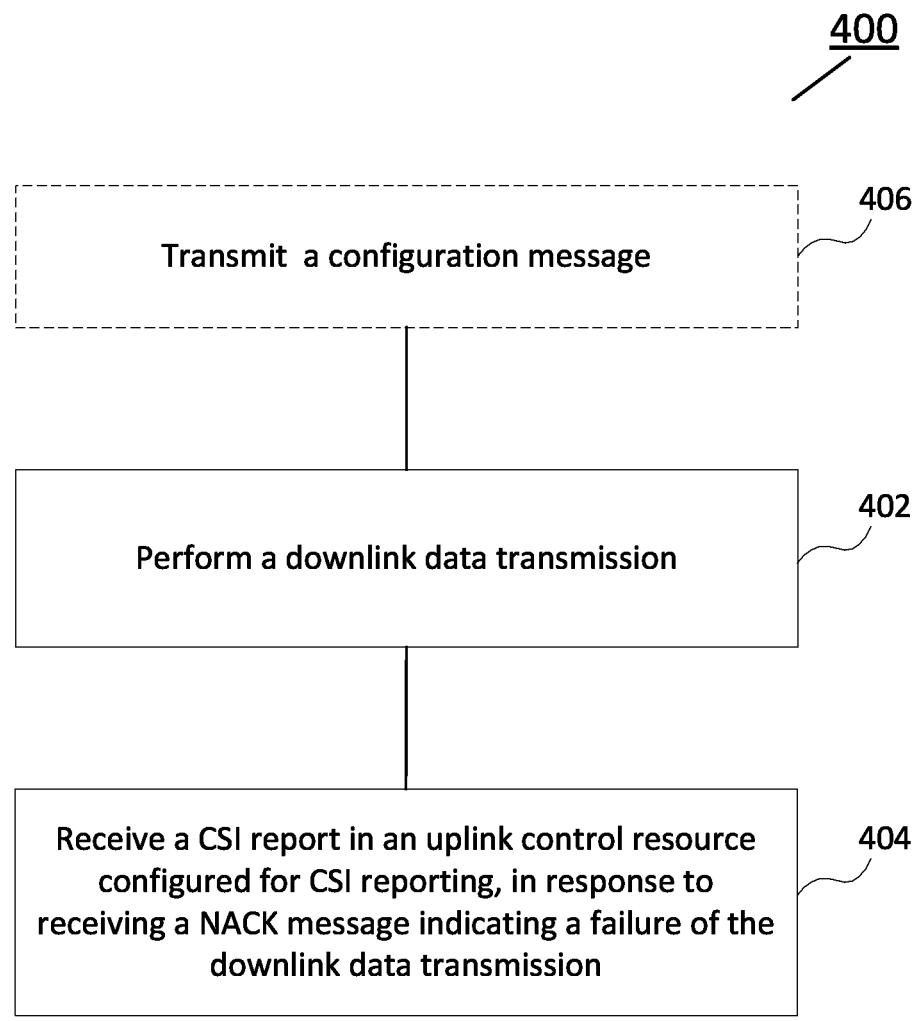
FIG. 4 is a flowchart illustrating another method performed by a network node according to some embodiment of the present disclosure.

FIG. 4 is a flowchart illustrating another method 400 according to some embodiments of the present disclosure. The method 400 illustrated in FIG. 4 may be performed by an apparatus implemented in a network node or communicatively coupled to a network node. In accordance with an exemplary embodiment, the network node such as a gNB/eNB may be configured to serve a terminal device as described with respect to FIG. 2. In the following description with respect to FIG. 4, for the same or similar parts as those in the previous exemplary embodiments, the detailed description will be properly omitted.

According to the exemplary method 400 illustrated in FIG. 4, the network node can perform a downlink data transmission to a terminal device, as shown in block 402. Corresponding to operations of the exemplary method 200 as illustrated in FIG. 2, the network node in the exemplary method 400 may receive a CSI report in an uplink control resource configured for CSI reporting from the terminal device, in response to receiving a NACK message which indicates a failure of the downlink data transmission from the terminal device, as shown in block 404.

Additionally, according to the exemplary method 400 illustrated in FIG. 4, the network node may transmit a configuration message, wherein the configuration message indicates at least one uplink control resource configured for CSI reporting, as shown in block 406. The detailed description with respect to the configuration message has been provided previously.

As described previously, the uplink control resource configured for CSI reporting may be shared by a group of terminal devices or dedicated to a terminal device. The shared uplink control resource may be orthogonal to the uplink control resources dedicated to the respective one of the group of terminal devices. The dedicated uplink control resource configured for CSI reporting may be same as or different from the dedicated uplink control resource for ACK/NACK transmission. In an exemplary embodiment, the network node may receive the CSI report and ACK/NACK feedback in the same dedicated uplink control resource.

Additionally, in some exemplary embodiments, the network node may transmit a control message to activate or deactivate transmission of the CSI report caused by the detection of failure.

A person skilled in the art will appreciate that, in the above described exemplary embodiments with respect to FIG. 3 or FIG. 4, at least one PUSCH resource may be allocated for CSI reporting instead of the PUCCH resource. The network node may provide the allocation of the PUSCH resource for CSI reporting to the terminal device in a PDCCH message.

The proposed solutions for CSI reporting in accordance with the previous exemplary embodiments can provide a resource-efficient and timely CSI reporting to meet the communication requirement on low latency and high reliability demanded by the CMTC services or the URLLC service.

The various blocks shown in FIGS. 1-4 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 5:
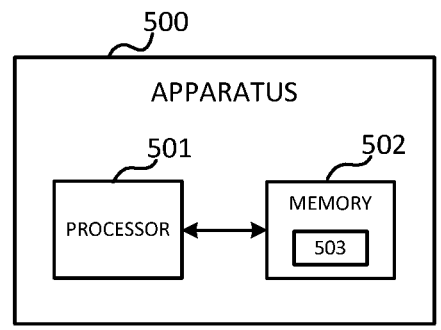
FIG. 5 is a block diagram illustrating an apparatus according to some embodiments of the present disclosure.

FIG. 5 is a block diagram illustrating an apparatus 500 according to various embodiments of the present disclosure. As shown in FIG. 5, the apparatus 500 may comprise one or more processors such as processor 501 and one or more memories such as memory 502 storing computer program codes 503. The memory 502 may be non-transitory machine/processor/computer readable storage medium. In accordance with some exemplary embodiments, the apparatus 500 may be implemented as an integrated circuit chip or module that can be plugged or installed into a terminal device as described with respect to FIG. 1 or FIG. 2, or a network node as described with respect to FIG. 3 or FIG. 4.

In some implementations, the one or more memories 502 and the computer program codes 503 may be configured to, with the one or more processors 501, cause the apparatus 500 at least to perform any operation of the method as described in connection with FIG. 1 or FIG. 2. In such embodiments, the apparatus 500 may be implemented as at least part of or communicatively coupled to the terminal device as described above. As a particular example, the apparatus 500 may be implemented as a terminal device.

In other implementations, the one or more memories 502 and the computer program codes 503 may be configured to, with the one or more processors 501, cause the apparatus 500 at least to perform any operation of the method as described in connection with FIG. 3 or FIG. 4. In such embodiments, the apparatus 500 may be implemented as at least part of or communicatively coupled to the network node as described above. As a particular example, the apparatus 500 may be implemented as a base station.

Alternatively or additionally, the one or more memories 502 and the computer program codes 503 may be configured to, with the one or more processors 401, cause the apparatus 500 at least to perform more or less operations to implement the proposed methods according to the exemplary embodiments of the present disclosure.

Figure 6:
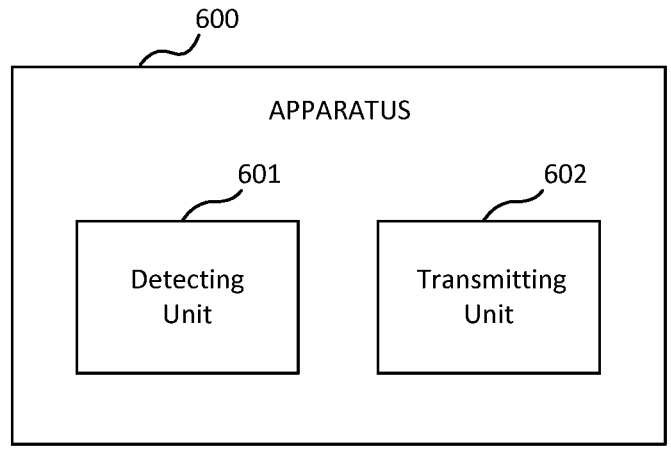
FIG. 6 is a block diagram illustrating an apparatus according to some embodiments of the present disclosure.

FIG. 6 is a block diagram illustrating an apparatus 600 according to some embodiments of the present disclosure. As shown in FIG. 6, the apparatus 600 may comprise a detecting unit 601 and a transmitting unit 602. In an exemplary embodiment, the apparatus 600 may be implemented in a terminal device such as a UE. The detecting unit 601 may be operable to carry out the operation in block 102 or 202, and the transmitting unit 602 may be operable to carry out the operation in block 104 or 204. Optionally, the detecting unit 601 and/or the transmitting unit 602 may be operable to carry out more or less operations to implement the proposed methods according to the exemplary embodiments of the present disclosure.

Figure 7:
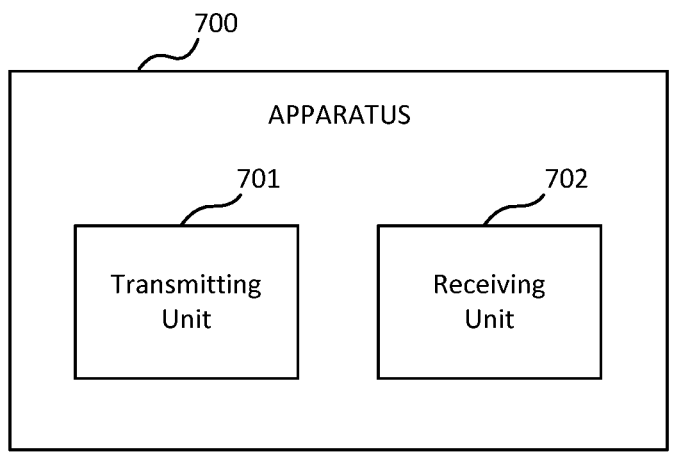
FIG. 7 is a block diagram illustrating an apparatus according to some embodiments of the present disclosure.

FIG. 7 is a block diagram illustrating an apparatus 700 according to some embodiments of the present disclosure. As shown in FIG. 7, the apparatus 700 may comprise a transmitting unit 701 and a receiving unit 702. In an exemplary embodiment, the apparatus 700 may be implemented in a network node such as a gNB/eNB. The transmitting unit 701 may be operable to carry out the operation in block 302 or 402, and the receiving unit 702 may be operable to carry out the operation in block 304 or 404. Optionally, the transmitting unit 701 and/or the receiving unit 702 may be operable to carry out more or less operations to implement the proposed methods according to the exemplary embodiments of the present disclosure.

Figure 8:
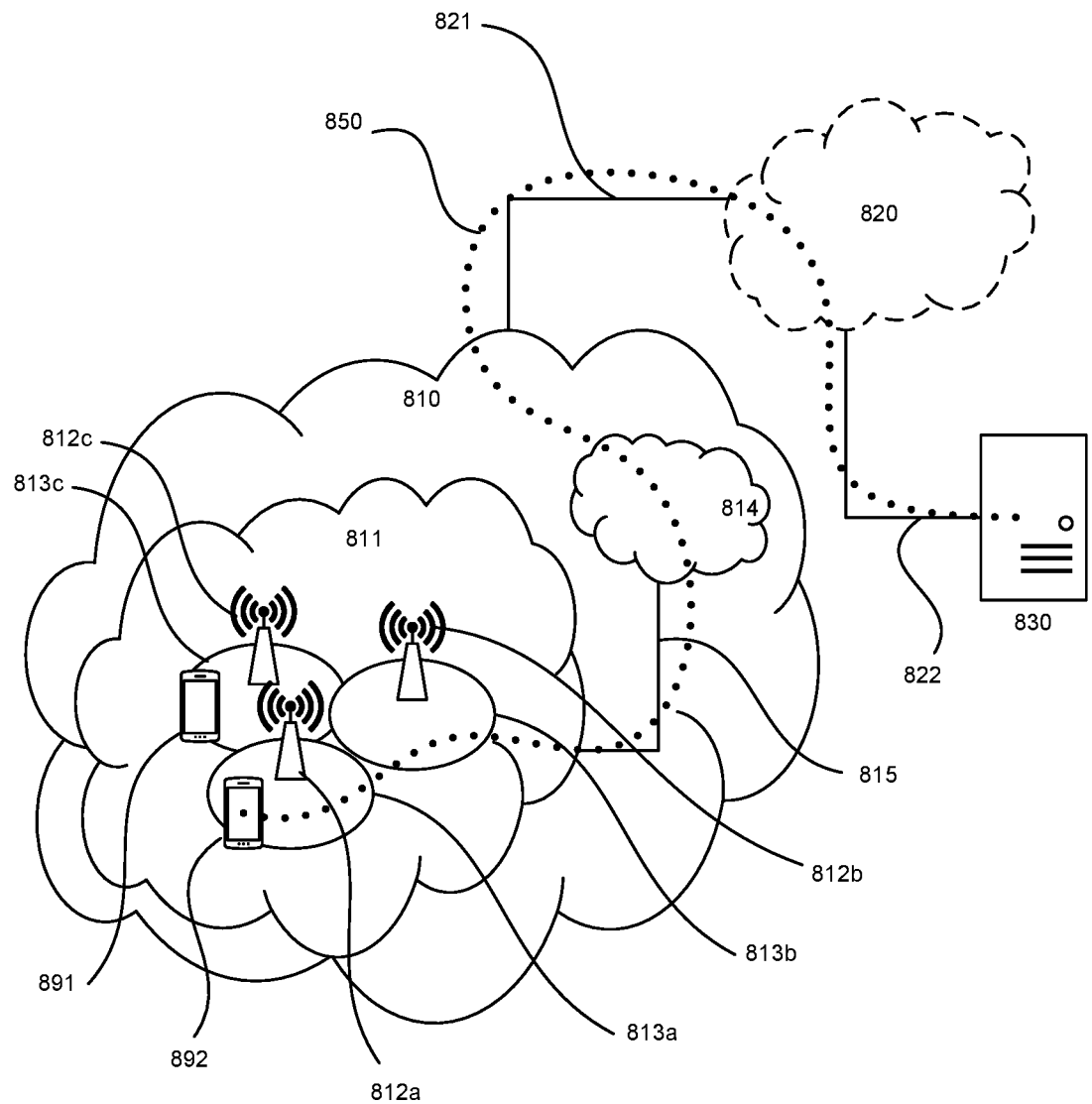
FIG. 8 is a block diagram illustrating a telecommunication network connected via an intermediate network to a host computer in accordance with some embodiments of the present disclosure.

FIG. 8 is a block diagram illustrating a telecommunication network connected via an intermediate network to a host computer in accordance with some embodiments of the present disclosure.

With reference to FIG. 8, in accordance with an embodiment, a communication system includes a telecommunication network 810, such as a 3GPP-type cellular network, which comprises an access network 811, such as a radio access network, and a core network 814. The access network 811 comprises a plurality of base stations 812a, 812b, 812c, such as NBs, eNBs, gNBs or other types of wireless access points, each defining a corresponding coverage area 813a, 813b, 813c. Each base station 812a, 812b, 812c is connectable to the core network 814 over a wired or wireless connection 815. A first UE 891 located in a coverage area 813c is configured to wirelessly connect to, or be paged by, the corresponding base station 812c. A second UE 892 in a coverage area 813a is wirelessly connectable to the corresponding base station 812a. While a plurality of UEs 891, 892 are illustrated in this example, the disclosed embodiments are equally applicable to a situation where a sole UE is in the coverage area or where a sole UE is connecting to the corresponding base station 812.

The telecommunication network 810 is itself connected to a host computer 830, which may be embodied in the hardware and/or software of a standalone server, a cloud-implemented server, a distributed server or as processing resources in a server farm. The host computer 830 may be under the ownership or control of a service provider, or may be operated by the service provider or on behalf of the service provider. Connections 821 and 822 between the telecommunication network 810 and the host computer 830 may extend directly from the core network 814 to the host computer 830 or may go via an optional intermediate network 820. An intermediate network 820 may be one of, or a combination of more than one of, a public, private or hosted network; the intermediate network 820, if any, may be a backbone network or the Internet; in particular, the intermediate network 820 may comprise two or more sub-networks (not shown).

The communication system of FIG. 8 as a whole enables connectivity between the connected UEs 891, 892 and the host computer 830. The connectivity may be described as an over-the-top (OTT) connection 850. The host computer 830 and the connected UEs 891, 892 are configured to communicate data and/or signaling via the OTT connection 850, using the access network 811, the core network 814, any intermediate network 820 and possible further infrastructure (not shown) as intermediaries. The OTT connection 850 may be transparent in the sense that the participating communication devices through which the OTT connection 850 passes are unaware of routing of uplink and downlink communications. For example, the base station 812 may not or need not be informed about the past routing of an incoming downlink communication with data originating from the host computer 830 to be forwarded (e.g., handed over) to a connected UE 891. Similarly, the base station 812 need not be aware of the future routing of an outgoing uplink communication originating from the UE 891 towards the host computer 830.

Figure 9:
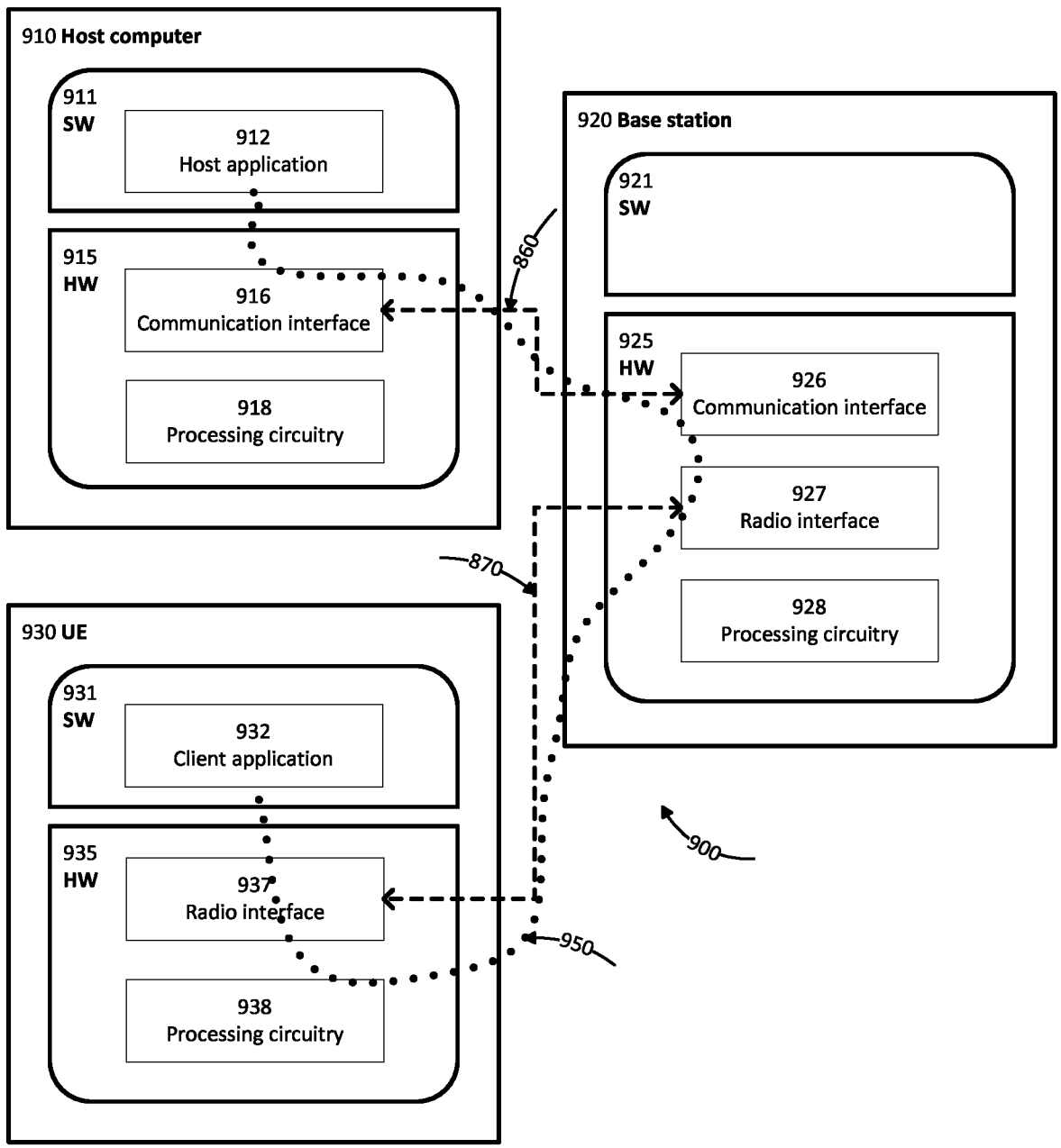
FIG. 9 is a block diagram illustrating a host computer communicating via a base station with a UE over a partially wireless connection in accordance with some embodiments of the present disclosure.

FIG. 9 is a block diagram illustrating a host computer communicating via a base station with a UE over a partially wireless connection in accordance with some embodiments of the present disclosure.

Example implementations, in accordance with an embodiment, of the UE, base station and host computer discussed in the preceding paragraphs will now be described with reference to FIG. 9. In a communication system 900, a host computer 910 comprises hardware 915 including a communication interface 916 configured to set up and maintain a wired or wireless connection with an interface of a different communication device of the communication system 900. The host computer 910 further comprises a processing circuitry 918, which may have storage and/or processing capabilities. In particular, the processing circuitry 918 may comprise one or more programmable processors, application-specific integrated circuits, field programmable gate arrays or combinations of these (not shown) adapted to execute instructions. The host computer 910 further comprises software 911, which is stored in or accessible by the host computer 910 and executable by the processing circuitry 918. The software 911 includes a host application 912. The host application 912 may be operable to provide a service to a remote user, such as UE 930 connecting via an OTT connection 950 terminating at the UE 930 and the host computer 910. In providing the service to the remote user, the host application 912 may provide user data which is transmitted using the OTT connection 950.

The communication system 900 further includes a base station 920 provided in a telecommunication system and comprising hardware 925 enabling it to communicate with the host computer 910 and with the UE 930. The hardware 925 may include a communication interface 926 for setting up and maintaining a wired or wireless connection with an interface of a different communication device of the communication system 900, as well as a radio interface 927 for setting up and maintaining at least a wireless connection 970 with the UE 930 located in a coverage area (not shown in FIG. 9) served by the base station 920. The communication interface 926 may be configured to facilitate a connection 960 to the host computer 910. The connection 960 may be direct or it may pass through a core network (not shown in FIG. 9) of the telecommunication system and/or through one or more intermediate networks outside the telecommunication system. In the embodiment shown, the hardware 925 of the base station 920 further includes a processing circuitry 928, which may comprise one or more programmable processors, application-specific integrated circuits, field programmable gate arrays or combinations of these (not shown) adapted to execute instructions. The base station 820 further has software 921 stored internally or accessible via an external connection.

The communication system 900 further includes the UE 930 already referred to. Its hardware 935 may include a radio interface 837 configured to set up and maintain a wireless connection 970 with a base station serving a coverage area in which the UE 930 is currently located. The hardware 935 of the UE 930 further includes a processing circuitry 938, which may comprise one or more programmable processors, application-specific integrated circuits, field programmable gate arrays or combinations of these (not shown) adapted to execute instructions. The UE 930 further comprises software 931, which is stored in or accessible by the UE 930 and executable by the processing circuitry 938. The software 931 includes a client application 932. The client application 932 may be operable to provide a service to a human or non-human user via the UE 930, with the support of the host computer 910. In the host computer 910, an executing host application 912 may communicate with the executing client application 932 via the OTT connection 950 terminating at the UE 930 and the host computer 910. In providing the service to the user, the client application 932 may receive request data from the host application 912 and provide user data in response to the request data. The OTT connection 950 may transfer both the request data and the user data. The client application 932 may interact with the user to generate the user data that it provides.

It is noted that the host computer 910, the base station 920 and the UE 930 illustrated in FIG. 9 may be similar or identical to the host computer 830, one of base stations 812a, 812b, 812c and one of UEs 891, 892 of FIG. 8, respectively. This is to say, the inner workings of these entities may be as shown in FIG. 9 and independently, the surrounding network topology may be that of FIG. 8.

In FIG. 9, the OTT connection 950 has been drawn abstractly to illustrate the communication between the host computer 910 and the UE 930 via the base station 920, without explicit reference to any intermediary devices and the precise routing of messages via these devices. Network infrastructure may determine the routing, which it may be configured to hide from the UE 930 or from the service provider operating the host computer 910, or both. While the OTT connection 950 is active, the network infrastructure may further take decisions by which it dynamically changes the routing (e.g., on the basis of load balancing consideration or reconfiguration of the network).

Wireless connection 970 between the UE 930 and the base station 920 is in accordance with the teachings of the embodiments described throughout this disclosure. One or more of the various embodiments improve the performance of OTT services provided to the UE 930 using the OTT connection 950, in which the wireless connection 970 forms the last segment. More precisely, the teachings of these embodiments may improve the latency and the power consumption, and thereby provide benefits such as lower complexity, reduced time required to access a cell, better responsiveness, extended battery lifetime, etc.

A measurement procedure may be provided for the purpose of monitoring data rate, latency and other factors on which the one or more embodiments improve. There may further be an optional network functionality for reconfiguring the OTT connection 950 between the host computer 910 and the UE 930, in response to variations in the measurement results. The measurement procedure and/or the network functionality for reconfiguring the OTT connection 950 may be implemented in software 911 and hardware 915 of the host computer 910 or in software 931 and hardware 935 of the UE 930, or both. In embodiments, sensors (not shown) may be deployed in or in association with communication devices through which the OTT connection 950 passes; the sensors may participate in the measurement procedure by supplying values of the monitored quantities exemplified above, or supplying values of other physical quantities from which the software 911, 931 may compute or estimate the monitored quantities. The reconfiguring of the OTT connection 950 may include message format, retransmission settings, preferred routing etc.; the reconfiguring need not affect the base station 920, and it may be unknown or imperceptible to the base station 920. Such procedures and functionalities may be known and practiced in the art. In certain embodiments, measurements may involve proprietary UE signaling facilitating the host computer 910's measurements of throughput, propagation times, latency and the like. The measurements may be implemented in that the software 911 and 931 causes messages to be transmitted, in particular empty or 'dummy' messages, using the OTT connection 950 while it monitors propagation times, errors etc.

Figure 10:
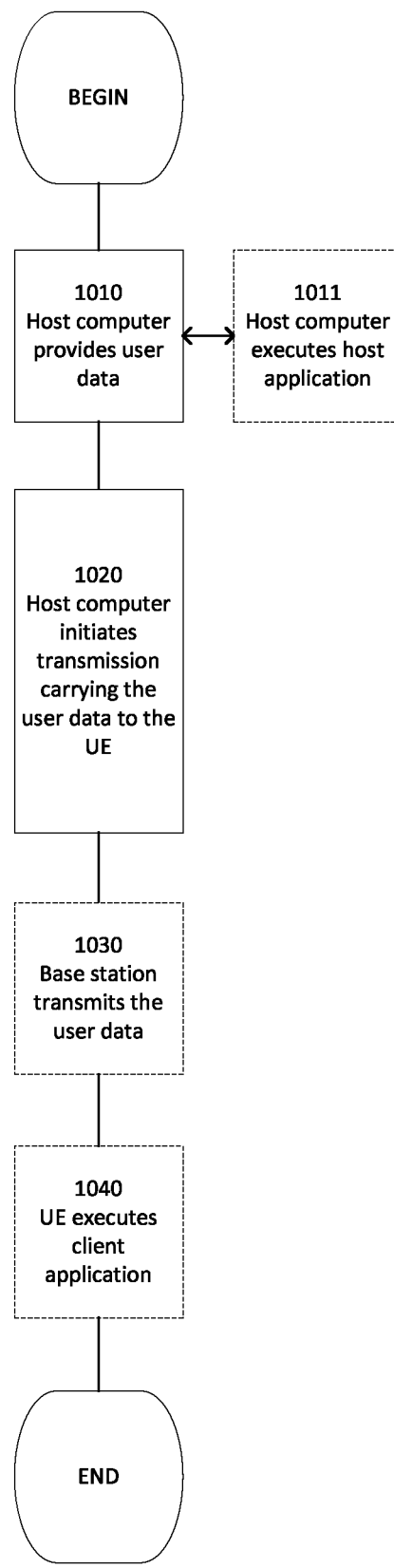
FIG. 10 is a flowchart illustrating a method implemented in a communication system, in accordance with an embodiment of the present disclosure.

FIG. 10 is a flowchart illustrating a method implemented in a communication system, in accordance with an embodiment. The communication system includes a host computer, a base station and a UE which may be those described with reference to FIG. 8 and FIG. 9. For simplicity of the present disclosure, only drawing references to FIG. 10 will be included in this section. In step 1010, the host computer provides user data. In substep 1011 (which may be optional) of step 1010, the host computer provides the user data by executing a host application. In step 1020, the host computer initiates a transmission carrying the user data to the UE. In step 1030 (which may be optional), the base station transmits to the UE the user data which was carried in the transmission that the host computer initiated, in accordance with the teachings of the embodiments described throughout this disclosure. In step 1040 (which may also be optional), the UE executes a client application associated with the host application executed by the host computer.

Figure 11:
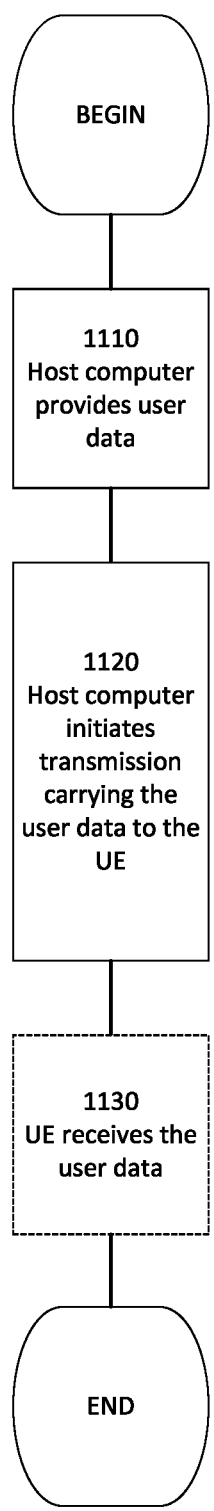
FIG. 11 is a flowchart illustrating a method implemented in a communication system, in accordance with an embodiment of the present disclosure.

FIG. 11 is a flowchart illustrating a method implemented in a communication system, in accordance with an embodiment. The communication system includes a host computer, a base station and a UE which may be those described with reference to FIG. 8 and FIG. 9. For simplicity of the present disclosure, only drawing references to FIG. 11 will be included in this section. In step 1110 of the method, the host computer provides user data. In an optional substep (not shown) the host computer provides the user data by executing a host application. In step 1120, the host computer initiates a transmission carrying the user data to the UE. The transmission may pass via the base station, in accordance with the teachings of the embodiments described throughout this disclosure. In step 1130 (which may be optional), the UE receives the user data carried in the transmission.

Figure 12:
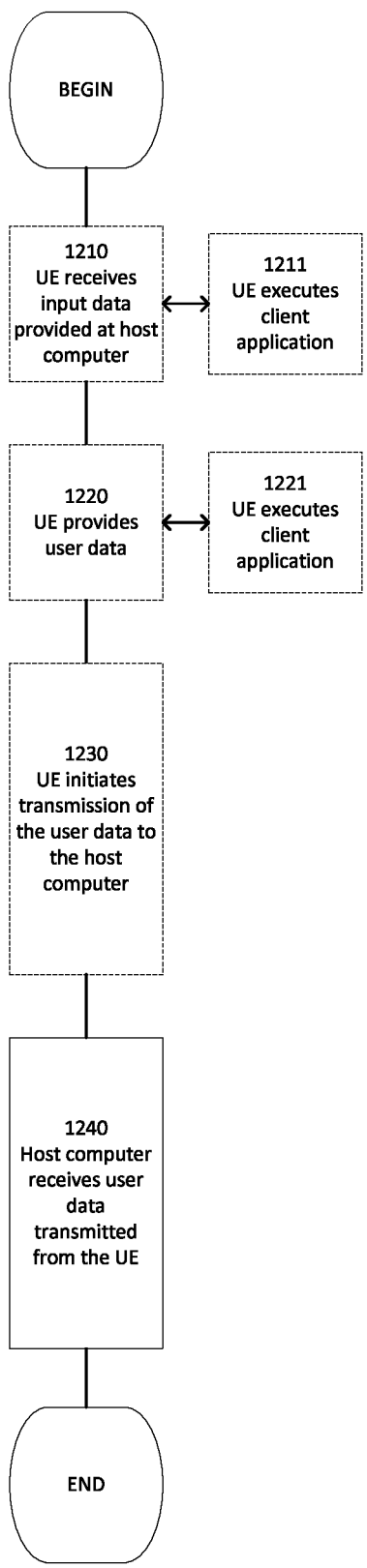
FIG. 12 is a flowchart illustrating a method implemented in a communication system, in accordance with an embodiment of the present disclosure.

FIG. 12 is a flowchart illustrating a method implemented in a communication system, in accordance with an embodiment. The communication system includes a host computer, a base station and a UE which may be those described with reference to FIG. 8 and FIG. 9. For simplicity of the present disclosure, only drawing references to FIG. 12 will be included in this section. In step 1210 (which may be optional), the UE receives input data provided by the host computer. Additionally or alternatively, in step 1220, the UE provides user data. In substep 1221 (which may be optional) of step 1220, the UE provides the user data by executing a client application. In substep 1211 (which may be optional) of step 1210, the UE executes a client application which provides the user data in reaction to the received input data provided by the host computer. In providing the user data, the executed client application may further consider user input received from the user. Regardless of the specific manner in which the user data was provided, the UE initiates, in substep 1230 (which may be optional), transmission of the user data to the host computer. In step 1240 of the method, the host computer receives the user data transmitted from the UE, in accordance with the teachings of the embodiments described throughout this disclosure.

Figure 13:
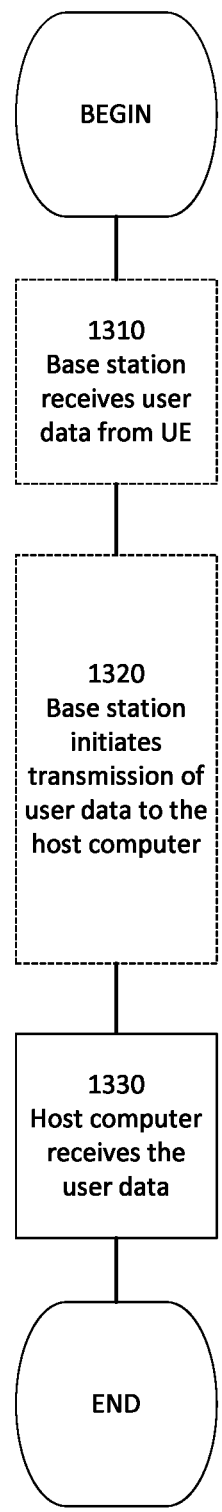
FIG. 13 is a flowchart illustrating a method implemented in a communication system, in accordance with an embodiment of the present disclosure.

FIG. 13 is a flowchart illustrating a method implemented in a communication system, in accordance with an embodiment. The communication system includes a host computer, a base station and a UE which may be those described with reference to FIG. 8 and FIG. 9. For simplicity of the present disclosure, only drawing references to FIG. 13 will be included in this section. In step 1310 (which may be optional), in accordance with the teachings of the embodiments described throughout this disclosure, the base station receives user data from the UE. In step 1320 (which may be optional), the base station initiates transmission of the received user data to the host computer. In step 1330 (which may be optional), the host computer receives the user data carried in the transmission initiated by the base station.

According to some embodiments of the present disclosure, there is provided a communication system. The communication system may comprise a host computer, the host computer including processing circuitry configured to provide user data and a communication interface configured to forward user data to a cellular network for transmission to a user equipment (UE). The UE may comprise a radio interface and processing circuitry. The UE's processing circuitry may be configured to perform any of the steps of the method according to some embodiments of the disclosure as shown in FIGS. 1 and 2.

According to some embodiments of the present disclosure, there is provided a method implemented in a communication system comprising a host computer, a base station and a user equipment (UE). The method may comprise: at the host computer, providing user data; and at the host computer, initiating a transmission carrying the user data to the UE via a cellular network comprising the base station, wherein the UE performs any of the steps of the method according to some embodiments of the disclosure as shown in FIGS. 1 and 2.

According to some embodiments of the present disclosure, there is provided a communication system. The communication system may comprise a host computer, the host computer including a communication interface configured to receive user data originating from a transmission from a user equipment (UE) to a base station. The UE may comprise a radio interface and processing circuitry. The UE's processing circuitry may be configured to perform any of the steps of the method according to some embodiments of the disclosure as shown in FIGS. 1 and 2.

According to some embodiments of the present disclosure, there is provided a method implemented in a communication system comprising a host computer, a base station and a user equipment (UE). The method may comprise, at the host computer, receiving user data transmitted to the base station from the UE, wherein the UE performs any of the steps of the method according to some embodiments of the disclosure as shown in FIGS. 1 and 2.

According to some embodiments of the disclosure, there is provided a communication system. The communication system may comprise a host computer, the host computer including processing circuitry configured to provide user data and a communication interface configured to forward the user data to a cellular network for transmission to a user equipment (UE). The cellular network may comprise a base station having a radio interface and processing circuitry. The base station's processing circuitry may be configured to perform any of the steps of the method according to some embodiments of the disclosure as shown in FIGS. 3 and 4.

According to some embodiments of the disclosure, there is provided a method implemented in a communication system comprising a host computer, a base station and a user equipment (UE). The method may comprise: at the host computer, providing user data; and at the host computer, initiating a transmission carrying the user data to the terminal device via a cellular network comprising the base station. The base station may perform any of the steps of the method according to some embodiments of the disclosure as shown in FIGS. 3 and 4.

According to some embodiments of the present disclosure, there is provided a communication system. The communication system may comprise a host computer, the host computer including a communication interface configured to receive user data originating from a transmission from a user equipment (UE) to a base station. The base station may comprise a radio interface and processing circuitry. The base station's processing circuitry may be configured to perform any of the steps of the method according to some embodiments of the disclosure as shown in FIGS. 3 and 4.

According to some embodiments of the disclosure, there is provided a method implemented in a communication system comprising a host computer, a base station and a user equipment (UE). The method may comprise, at the host computer, receiving, from the base station, user data originating from a transmission which the base station has received from the UE, wherein the base station performs any of the steps of the method according to some embodiments of the disclosure as shown in FIGS. 3 and 4.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method performed by a terminal device, comprising:
   detecting a downlink transmission; and
   transmitting, in response to the detection of the downlink transmission, a channel state information (CSI) report in an uplink control resource configured for CSI reporting,
   wherein the uplink control resource comprises a Physical Uplink Control Channel (PUCCH) resource;
   wherein the PUCCH resource is shared by a group of terminal devices including the terminal device, the group of terminal devices supporting a low latency and high reliability communication service, the shared PUCCH resource being orthogonal to a PUCCH resource dedicated to a respective one of the group of terminal devices.

2. The method according to claim 1, wherein detecting the downlink transmission comprises:
   detecting a failure of a downlink data transmission;
   wherein the CSI report is transmitted in response to the detection of the failure.

3. The method according to claim 1, wherein detecting the downlink transmission comprises:
   detecting a Physical Downlink Control Channel (PDCCH) transmission to trigger CSI reporting.

4. The method according to claim 3, wherein the PDCCH transmission is addressed to a CSI-radio network temporary identifier (CSI-RNTI), or wherein the PDCCH transmission is common to a plurality of terminal devices, or wherein the PDCCH transmission carries a downlink assignment and an indicator indicating the triggering of the CSI reporting.

5. The method according to claim 3, wherein the PDCCH transmission indicates the uplink control resource configured for CSI reporting.

6. The method according to claim 5, wherein the uplink control resource is indicated by a control channel element (CCE) index for the PDCCH transmission, or by a specific indicator carried by the PDCCH transmission.

7. The method according to claim 1, wherein detecting the downlink transmission comprises:
   detecting a downlink data transmission, wherein the downlink data transmission carries a medium access control (MAC) control element for triggering CSI reporting; or
   detecting a downlink data transmission which uses a preconfigured downlink assignment.

8. The method according to claim 7, wherein the downlink data transmission indicates the uplink control resource configured for CSI reporting with a physical resource block (PRB) index for the downlink data transmission.

9. The method according to claim 1, further comprising:
receiving a configuration message from a network node, wherein the configuration message indicates at least one uplink control resource configured for CSI reporting;
wherein the CSI report is transmitted in a selected uplink control resource from the at least one uplink control resource by the terminal device.

10. The method according to claim 9, wherein the configuration message further indicates a content of the CSI report and an object of CSI measurement.

11. The method according to claim 10, wherein the content of the CSI report comprises at least one of the followings:
channel quality indicator (CQI);
delta-CQI;
rank indication (RI);
precoding matrix indicator (PMI);
radio frequency transmission point selection;
an index of a preferable component carrier;
interference measurement; and
transmission time interval (TTI) bundling repetition number recommend by the terminal device.

12. The method according to claim 9, wherein the configuration message further indicates a transmission control priority for the uplink control resource.

13. The method according to claim 2, further comprising:
receiving a control message to activate or deactivate the transmission of the CSI report caused by the detection of failure; and
activating or deactivating the transmission of the CSI report caused by the detection of failure.

14. The method according to claim 2, wherein the CSI report and a NACK message are transmitted in the same dedicated uplink control resource to the terminal device in response to the detection of the failure.

15. A terminal device, comprising:
one or more processors; and
one or more memories comprising computer program codes,
the one or more memories and the computer program codes configured to, with the one or more processors, cause the terminal device at least to perform the method according to claim 1.

16. A method performed by a network node, comprising:
performing a downlink transmission to a terminal device; and
receiving a CSI report in an uplink control resource configured for CSI reporting from the terminal device, in response to the downlink transmission;
wherein the uplink control resource comprises a Physical Uplink Control Channel (PUCCH) resource;
wherein the PUCCH resource is shared by a group of terminal devices including the terminal device, the group of terminal devices supporting a low latency and high reliability communication service, the shared PUCCH resource being orthogonal to a PUCCH resource dedicated to a respective one of the group of terminal devices.

17. The method according to claim 16, wherein performing the downlink transmission to the terminal device comprises:
performing a downlink data transmission to the terminal device;
wherein the CSI report is received in response to receiving a NACK message which indicates a failure of the downlink data transmission from the terminal device.

* * * * *